United States Patent
Hiroi et al.

(10) Patent No.: US 8,716,626 B2
(45) Date of Patent: May 6, 2014

(54) SHIELDED METAL ARC WELDING MACHINE

(75) Inventors: Toru Hiroi, Sakado (JP); Kentaro Kawabata, Sayama (JP)

(73) Assignee: Denyo Kabushiki Kaisha, Tokyo-To (JP)

( * ) Notice: Subject to any disclaimer, the term of this patent is extended or adjusted under 35 U.S.C. 154(b) by 1346 days.

(21) Appl. No.: 11/892,863

(22) Filed: Aug. 28, 2007

(65) Prior Publication Data

US 2008/0296265 A1    Dec. 4, 2008

(30) Foreign Application Priority Data

May 29, 2007 (JP) ................................ 2007-141892

(51) Int. Cl.
   *B23K 9/10*    (2006.01)
(52) U.S. Cl.
   USPC ................ 219/130.33; 219/133; 219/137 PS
(58) Field of Classification Search
   USPC ................ 219/72, 130.31, 130.33, 133, 134, 219/137 PS
   See application file for complete search history.

(56) References Cited

U.S. PATENT DOCUMENTS 6,040,556 A * 3/2000 Shinya et al. ................ 219/133

FOREIGN PATENT DOCUMENTS

| JP | 57-112975 | 7/1985 |
| JP | 11-170046 | 6/1999 |

* cited by examiner

*Primary Examiner* — Brian Jennison
(74) *Attorney, Agent, or Firm* — Jacobson Holman PLLC

(57) ABSTRACT

A shielded metal arc welding machine having a characteristic with a constant current output characteristic and a drooping output characteristic properly combined is provided. A shielded metal arc welding machine having a constant current output characteristic, characterized by having a desired drooping output characteristic, which has an optional drooping degree with a point at which a characteristic line of said constant current output characteristic intersects a welding load characteristic line L as a base point, and replaces said constant current output characteristic.

3 Claims, 6 Drawing Sheets

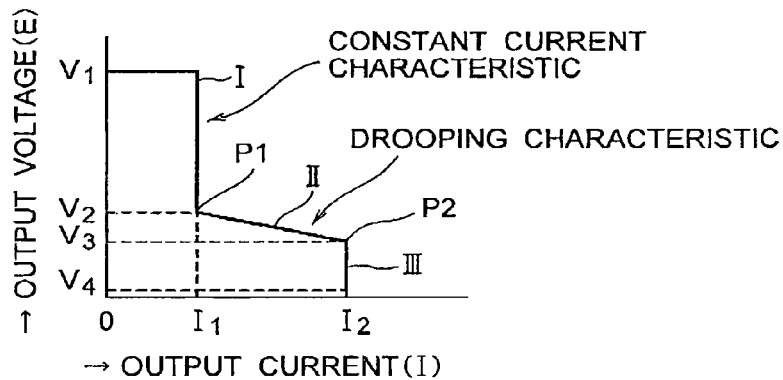
PRIOR ART
FIG. 6
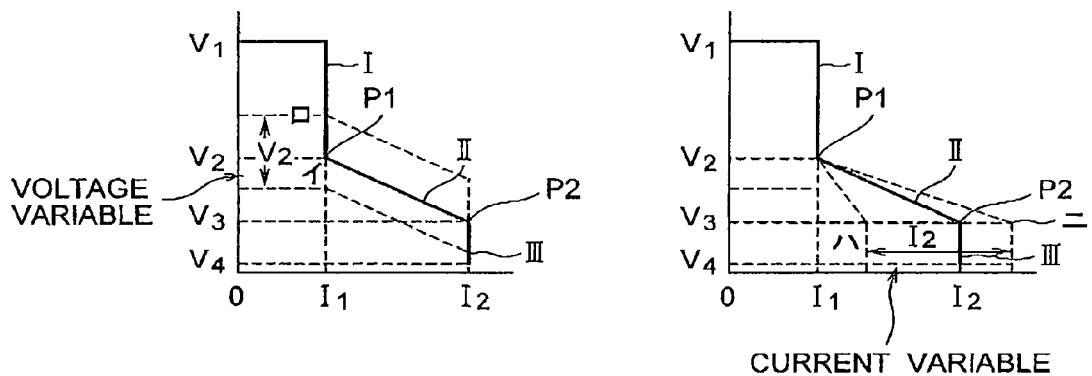
PRIOR ART
FIG. 7A
PRIOR ART
FIG. 7B

SHIELDED METAL ARC WELDING MACHINE

BACKGROUND OF THE INVENTION

1. Field of the Invention

The present invention relates to a shielded metal arc welding machine, and particularly relates to a shielded metal arc welding machine having both a constant current output characteristic and a drooping output characteristic having an adjustable drooping degree and showing a characteristic easily used by skilled and unskilled workers.

2. Description of the Related Art

Conventionally, an output characteristic of a welding machine is given a constant current output characteristic to enable an unskilled worker to perform stable arc welding. However, there exists a problem difficult to address with only the constant current output characteristic, depending on the kinds of welding rods and welding positions, and there is provided a welding machine in which a drooping output characteristic is combined with a constant current output characteristic, and a transition point of the characteristics is made variable (see Japanese Patent Laid-Open No. 11-170046).

This includes a constant current output characteristic I in a welding current region, a constant current output characteristic III for maximum current control, and a drooping output characteristic II connecting these two constant current output characteristics I and III, as shown in FIG. 6. Since the constant current output characteristic which is normally used and the drooping output characteristic are optionally connected and combined, welding operations corresponding to various welding rods can be performed.

The drooping output characteristic II which changes a drooping characteristic transition voltage as shown in FIG. 7A and the drooping output characteristic II which changes a constant current characteristic transition current as shown in FIG. 7B are provided.

However, the above described welding machine which enables unskilled workers to perform stable arc welding is not always suitable for skilled workers to exhibit their skill. Skilled workers have the experience of performing welding operations while performing fine regulation of heat input by shifting the intersections of a drooping output characteristic line and welding load characteristic lines L, L' and L" by using a direct-current generator (third blush generator) having the drooping output characteristic as shown in FIG. 8 to adjust the welding current to be I, I' and II".

On the other hand, in the welding machine having the constant current output characteristic, when the transition point to the drooping output characteristic from the constant current output characteristic is set at the welding load characteristic line L as shown in FIG. 9, the welding current can be regulated in the output current region larger than that at the transition point, but in the smaller current region, the current becomes a constant current and cannot be regulated.

The present invention is made in view of the above described point, and has an object to provide a shielded metal arc welding machine having a characteristic with a constant current output characteristic and a drooping output characteristic properly combined.

SUMMARY OF THE INVENTION

In order to attain the above-described object, in the present invention, a shielded metal arc welding machine having a constant current output characteristic, characterized by including a desired drooping output characteristic, which has an optional drooping degree with a point at which a characteristic line of the aforesaid constant current output characteristic intersects a welding load characteristic line as a base point, and replaces said constant current output characteristic is provided.

Since the present invention has a desired drooping output characteristic with the point at which the output characteristic line in the arc welding machine having a constant current output characteristic and the welding load characteristic line intersect each other as a base point as described above, a skilled worker can carry out an optimal welding operation by adjusting the drooping degree to an optional drooping degree in accordance with a welding position and a welding member, and an unskilled worker can perform stable arc welding without a current change by unintentional movement of the hands if the unskilled worker adjusts the drooping degree to the maximum.

BRIEF DESCRIPTION OF THE DRAWINGS

FIG. 6 is an output characteristic chart of an arc welding machine having a conventional constant current output characteristic and drooping output characteristic;

FIGS. 7A and 7B are output characteristic charts of the arc welding machine having the conventional constant current output characteristic and drooping output characteristic;

DETAILED DESCRIPTION OF THE PREFERRED EMBODIMENTS

Hereinafter, embodiments of the present invention in the case where an engine-driven welding generator is adopted as a welding power supply of a shielded metal arc welding machine will be described with reference to the attached drawings.

[Embodiment 1]

Figure 1:
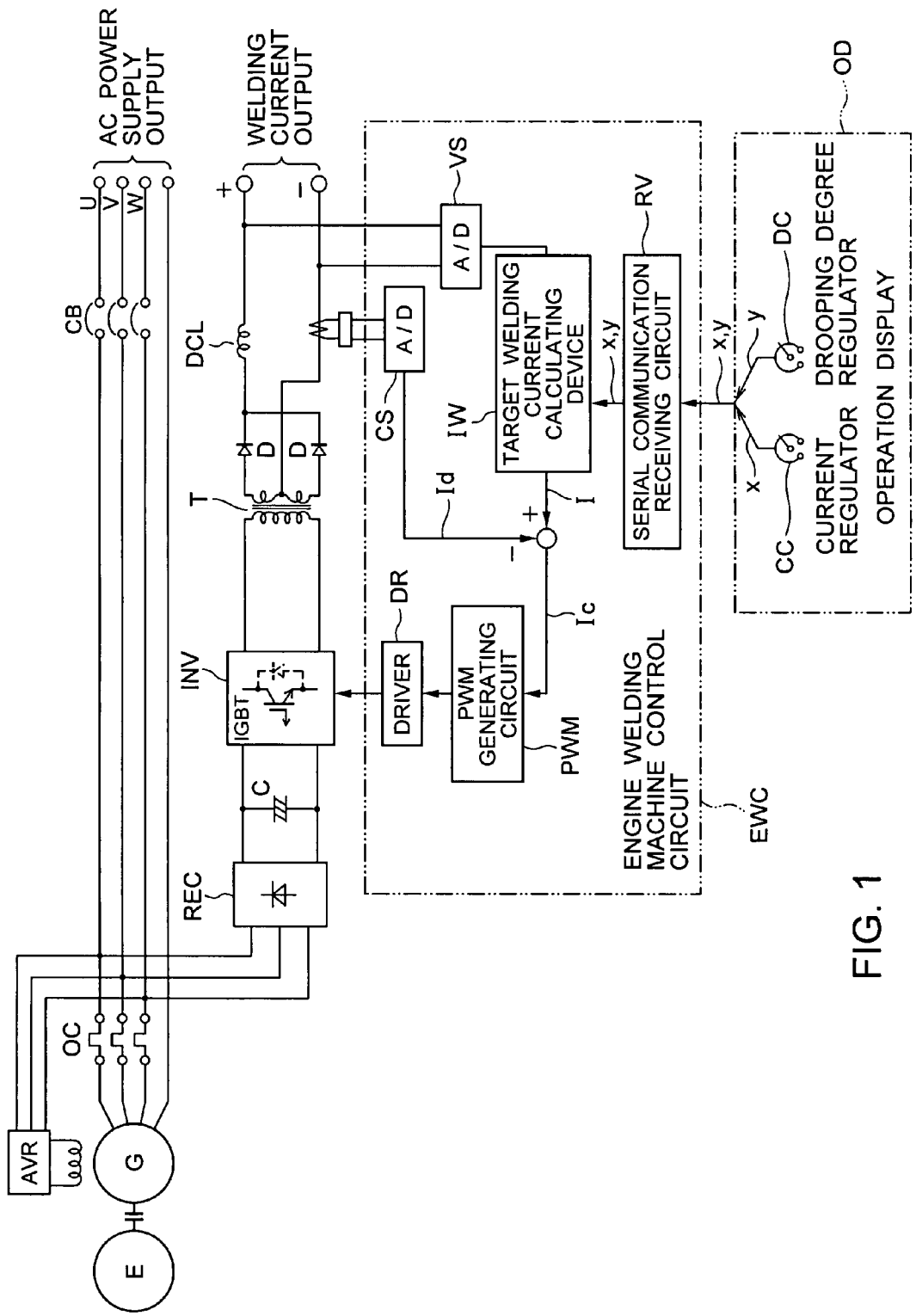
FIG. 1 is a block diagram showing a circuit configuration of an embodiment 1 of the present invention.

FIG. 1 is a block diagram showing a circuit configuration of an embodiment 1 of the present invention. The embodiment 1 supplies an alternating-current power supply output and a welding output by driving a welding generator G by an engine E as shown in FIG. 1.

The welding generator G takes out an output controlled by an automatic voltage regulator AVR via an overcurrent relay OC and divides it into two. One is supplied to output terminals U, V, W and O through a circuit breaker CB, and the other is subjected to DC-AC conversion and AC-DC conversion beyond a rectifier REC, and welding current control, and is supplied to output terminals + and −.

The rectified output from the rectifier REC is given to an inverter INV through a capacitor C and AC-converted, and is given to the output terminals + and − as a direct-current output via a high frequency transformer T, rectifiers D and D, and a direct-current reactor DCL.

From the direct-current output, a current Id is detected by a current sensor CS. A voltage detected from the detected current Id by a voltage sensor VS is given to a target welding current calculating device IW, and calculation based on command signals x and y from an operation display OD is performed.

A target welding current I formed as a result of the calculation is compared with the detected current Id, an obtained control signal Ic is given to a PWM generating circuit PWM and a driver DR, and control of the inverter INV is performed.

The operation display OD which gives the command signals x and y to the target welding current calculating device IW has a current regulator CC and a drooping degree regulator DC, and gives the command signals x and y obtained by operation to the target welding current calculating device IW via a serial communication receiving circuit RV. The operation content of the target welding current calculating device IW will be described later by using FIGS. 2 to 4.

Figure 2:
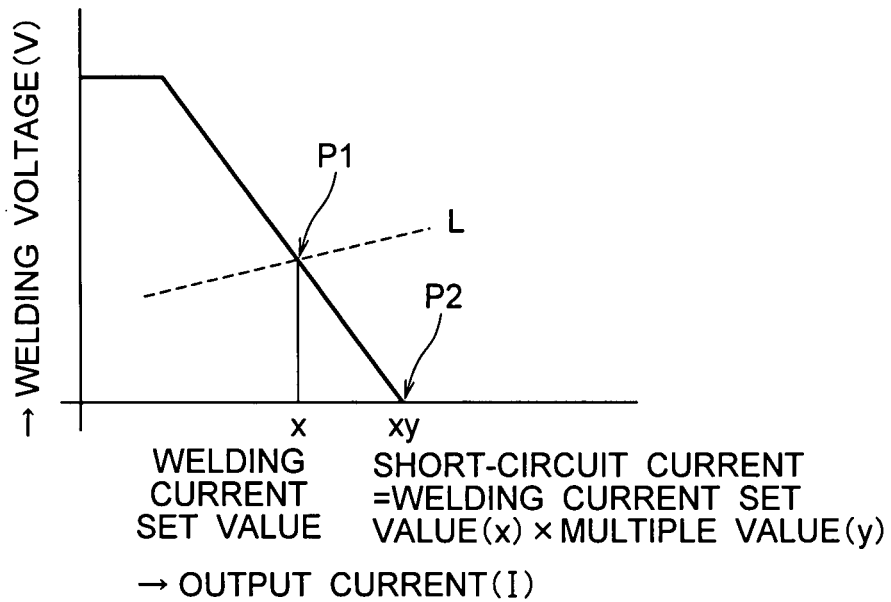
FIG. 2 is a characteristic chart showing a drooping output characteristic with a constant current output characteristic as a basis.

FIG. 2 is a characteristic chart showing a drooping output characteristic based on a constant current output characteristic. The characteristic is the result of realizing the drooping output characteristic by changing the constant current output characteristic of the arc welding machine having a welding voltage V, and giving an inclination in the characteristic chart.

The drooping output characteristic line shown by the solid line in FIG. 2 intersects a welding load characteristic line L shown by the broken line at an intersection p1, the welding current set value is "x", and a short-circuit current is "xy" (=welding current set value x×multiple value y) which is an intersection p2 with the welding voltage V=0. Here, the welding load characteristic line L is expressed by Welding voltage V=20+0.04×welding current I.

Figure 3:
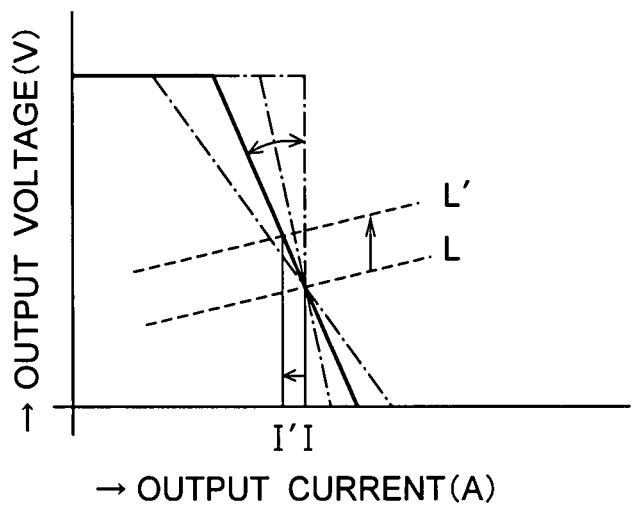
FIG. 3 is a characteristic chart showing a state of regulation of an output current by changing a drooping degree of a drooping output characteristic shown in FIG. 2.

FIG. 3 shows the state of regulation of the output current by changing the drooping degree of the drooping output characteristic shown in FIG. 2. In FIG. 3, the drooping output characteristic which becomes the basis is shown by the solid line, the drooping output characteristics with the drooping degrees changed are shown by the two phantom lines, the case where the inclination degree of the drooping output characteristic is adjusted to be the maximum, that is, the constant current output characteristic is shown by another phantom line, and the relationship between these respective characteristic lines, the welding load characteristic lines L and L' and the welding current I and I' is shown.

Specifically, in the drooping output characteristic shown by the solid line, when a welding operator extends the arc length and the welding load characteristic line changes from L to L', the output current changes from I to I', but in the drooping output characteristics shown by the phantom lines at both sides of the solid line, the change width of the output current becomes larger, or smaller.

Thereby, the regulation degree of the output current can be made larger or smaller by regulating the inclination degree of the drooping output characteristic.

Figure 4:
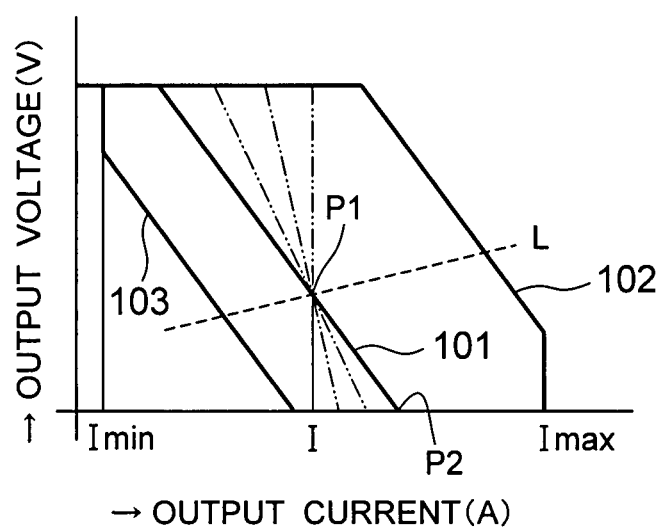
FIG. 4 is a characteristic chart showing an example of changing a basic drooping output characteristic shown in FIG. 3 to be more practical.

FIG. 4 shows an example of changing the basic drooping output characteristic shown in FIG. 3 to be more practical. In the characteristic shown in FIG. 4, when the output current of the arc welding machine has a minimum value "Imin" and a maximum value "Imax", the drooping output characteristic 101 becomes a characteristic line 102 at the maximum side in the range of the generator capacity, and a characteristic line 103 at the minimum side.

Specifically, the drooping output characteristic at a predetermined inclination angle can be moved between the current maximum value "Imax" and minimum value "Imin". If the drooping degree is changed, drooping output characteristic lines (shown by the phantom lines) with the inclination degrees differing with an intersection p1 of the drooping output characteristic line 101 and the welding load characteristic line L as a center.

Figure 5:
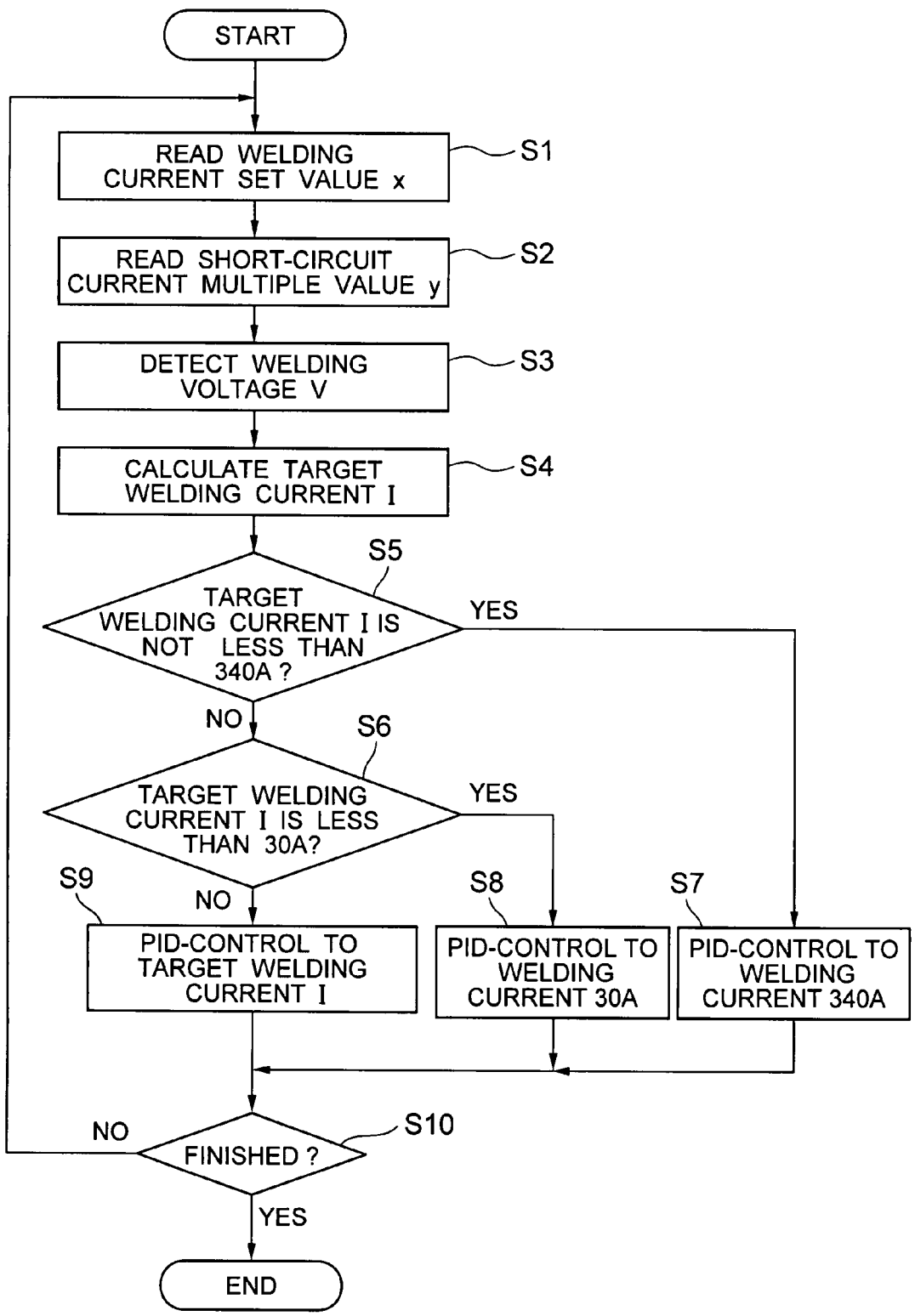
FIG. 5 is a flow chart showing an operation content of a target welding current calculating device IW of an arc welding machine shown in FIG. 1.
Figure 8:
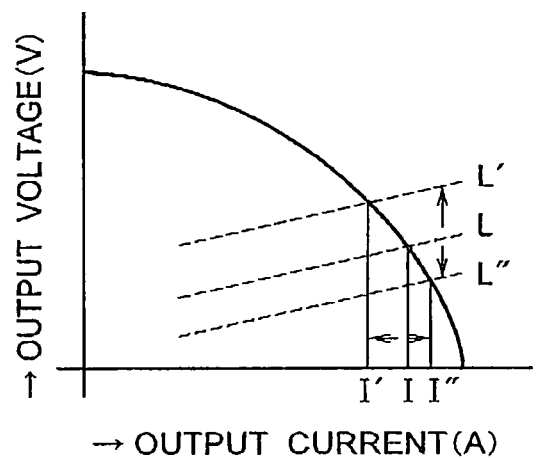
FIG. 8 is an output characteristic chart of a conventional third brush generator.
Figure 9:
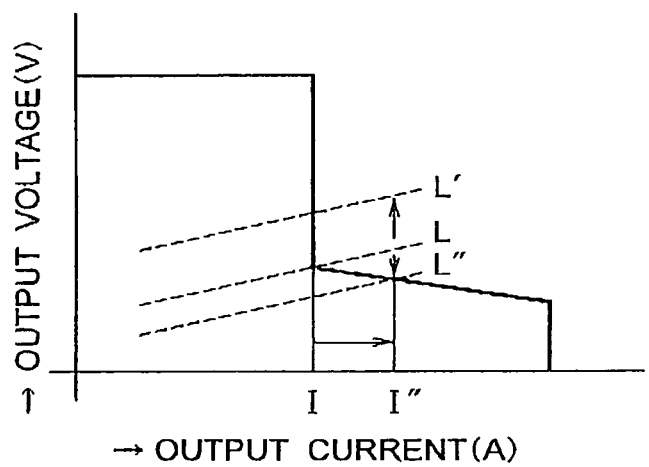
FIG. 9 is a characteristic chart showing the relationship of an output characteristic and a welding load characteristic line in an arc welding machine having the conventional constant current output characteristic.

FIG. 5 is a flow chart showing an operation content of the target welding current calculating device IW of the arc welding machine shown in FIG. 1. When the target welding current calculating device IW is given a set welding current "x", a short-circuit current multiple value "y", and a welding voltage detected value "V" from a welding voltage sensor VS, it obtains the target welding current "I" by the following formula. Specifically, $$I = b - a \times V$$

Here, $b = x \times y$
$a = (b-x)/(20+0.04x)$
where x: set welding current (30 to 320A)
y: short-circuit current multiple value (1.0 to 2.0)
V: welding voltage detected value By controlling a deviation of the target welding current obtained from the above described formula and the welding current detected value to be zero, control of the drooping output characteristic and the constant current output characteristic can be performed continuously by the same program.

Since tremendous welding output characteristic data which has been conventionally required can be omitted owing to the program, the memory capacity can be significantly reduced.

Explaining this based on FIG. 5, the welding current set value "x" is first read (step S1), a short-circuit current multiple value "y" is read (step S2), and the welding voltage detected value V is further read (step S3).

When these three elements "x", "y" and "V" are given, the welding current target value "I" is obtained from the above described formula (step S4). It is determined whether or not the welding current target value "I" is the maximum current (340A in this case) or larger (step S5), and if the welding current target value "I" is the maximum current or larger, the welding current is PID-controlled to a welding current 340A in step S7.

If the welding current target value "I" is less than 340A, the flow goes to step S6, and it is determined whether the target welding current "I" is smaller than a minimum value 30A or not. If the target welding current "I" is less than the minimum value 30A, the welding current is PID-controlled to a welding current 30A in step S8, and if it is 30A or more, the welding current is PID-controlled to the target welding current "I" in step S9.

Here, the maximum current 340A is the value determined depending on the capacity of a welding machine, and the minimum current 30A is the minimum current that can keep arc stable. These values can be properly determined in accordance with the applied welding machine.

When the short-circuit multiple value "y" is regulated to the minimum value 1.0, the constant current output characteristic is obtained. When the short-circuit multiple value "y" is made large, the short-circuit current becomes large and the degree of the inclination of the drooping output characteristic becomes gradual. However, the maximum value is not especially limited to 2.0.

These controls are continued until the operation end command is given (step S10).

As above, the operation as the arc welding machine which generates an output current based on the composite control characteristic of the constant current output characteristic and the drooping output characteristic shown in FIG. 4.

[Other Embodiments]

In the above described embodiment, the case of using the engine-driven welding generator as the power supply of the shielded metal arc welding machine is shown, but as the welding power supply, a battery power supply, and a power supply from a commercial power supply through a transformer may be used.

In the above described embodiment, the arc welding machine having the composite characteristic in which the single drooping output characteristic is combined with the constant current output characteristic of the maximum current or the minimum current is shown, but an arc welding machine having the composite characteristic having two drooping output characteristics with different drooping degrees may be constituted.

For this purpose, another target welding current calculating device is provided, and the two target welding current calculating devices are used by switching them Thereby, the arc welding machine having the composite characteristic having two drooping output characteristics with different drooping degrees respectively between the constant current output characteristics by the maximum current value and the minimum current value can be constituted.

What is claimed is:

1. A shielded metal arc welding machine having a constant current output characteristic, comprising:
    a welding machine controller for controlling the welding machine, including a target welding current calculating device having a drooping output characteristic,
    said target welding current calculating device having an optional drooping degree by connecting two points, one of the two points being a base point at which a characteristic line of said constant current output characteristic intersects a welding load characteristic line, and the other of the two points being set on an output current line of welding voltage V=0 as a predetermined value, which is derived by multiplying a short-circuit current value by a multiple value, and the drooping output characteristics replaces said constant current output characteristic,
    said drooping output characteristic being based on a following formula:

$$I = b - a \times V$$

here, b=x×y
    a=(b−x)/(20+0.04x)
    where I: target welding current,
        x: set welding current
        y: short-circuit current multiple value, and
        V: welding voltage detected value,
    said drooping output characteristic being controlled by obtaining the drooping degree by calculation by setting a multiple value of a short-circuit current with respect to a set value of a welding current and a detected value of a welding voltage, instead of setting the drooping degree, that is, an inclination angle,
    said welding machine controller controlling said welding machine according to the drooping characteristic which is derived by connecting the two points.

2. The shielded metal arc welding machine according to claim 1,
    wherein in a region where an output current value is a minimum current value or less, a current characteristic is the constant current output characteristic with said minimum current as a reference.

3. The shielded metal arc welding machine according to claim 1,
    wherein in a region where an output current value is a maximum current or more, a current characteristic is the constant current output characteristic with said maximum current as a reference.

\* \* \* \* \*